(12) United States Patent
Flint et al.

(10) Patent No.: US 9,196,306 B2
(45) Date of Patent: Nov. 24, 2015

(54) SMART SCALING AND CROPPING

(75) Inventors: Gary Flint, San Jose, CA (US); Stefan Hafeneger, Elsdorf (DE)

(73) Assignee: Apple Inc., Cupertino, CA (US)

( * ) Notice: Subject to any disclaimer, the term of this patent is extended or adjusted under 35 U.S.C. 154(b) by 1070 days.

(21) Appl. No.: 13/016,930

(22) Filed: Jan. 28, 2011

(65) Prior Publication Data

US 2012/0198337 A1    Aug. 2, 2012

(51) Int. Cl.
*G11B 27/00* (2006.01)
*G11B 27/034* (2006.01)
*G11B 27/34* (2006.01)

(52) U.S. Cl.
CPC .............. *G11B 27/034* (2013.01); *G11B 27/34* (2013.01)

(58) Field of Classification Search
CPC .. G11B 27/034; G11B 2220/90; G11B 27/34; G11B 27/105; H04N 9/8042
See application file for complete search history.

(56) References Cited

U.S. PATENT DOCUMENTS

| | | | |
|---|---|---|---|
| 8,156,176 B2 * | 4/2012 | Lerman et al. | 709/203 |
| 2008/0291265 A1 | 11/2008 | Wagner et al. | |
| 2009/0238542 A1 | 9/2009 | Adiletta et al. | |
| 2010/0178034 A1 * | 7/2010 | Masuo et al. | 386/95 |
| 2010/0232729 A1 | 9/2010 | Peleg et al. | |

* cited by examiner

Primary Examiner — William C Vaughn, Jr.
Assistant Examiner — Daniel Tekle
(74) Attorney, Agent, or Firm — Schwegman Lundberg & Woessner, P.A.

(57) ABSTRACT

Smart scaling and cropping of video clips is disclosed. According to some implementations, a video clip sequence can be generated from one or more video clips. Video clips added to the video clip sequence can be automatically modified (e.g. scaled and/or cropped) to conform to the dimensions and/or aspect ratio of video clips in the video clip sequence. Video clips can be modified based on the spatial characteristics of the video clips, for example, the location and size of objects of interest (e.g., faces) in the video clips. Implementations may also include a method, system and/or non-transitory, computer-readable medium encoded with instructions for performing smart scaling and cropping. Other aspects and implementations are also disclosed.

22 Claims, 6 Drawing Sheets

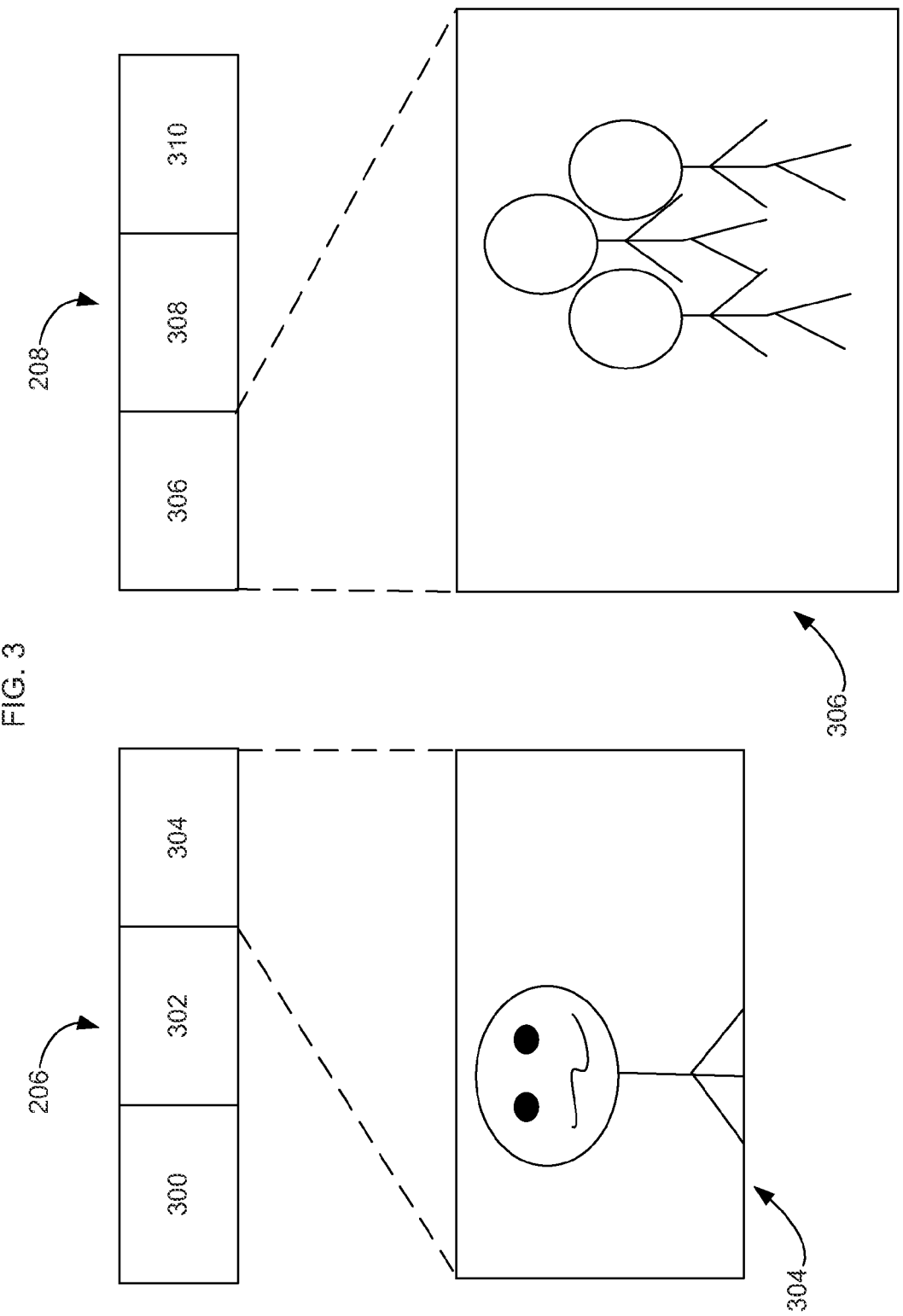

SMART SCALING AND CROPPING

TECHNICAL FIELD

The disclosure generally relates to video editing.

BACKGROUND

Some video editing applications allow a user to generate a single video by combining multiple video clips. Sometimes video clips have different display dimensions (e.g., height and/or width) and/or aspect ratios. When video clips having different dimensions are played in sequence, the differences in display dimensions may cause the video to have unpleasant transitions between video clips.

SUMMARY

Smart scaling and cropping of video clips is disclosed. According to some implementations, a video clip sequence can be generated from one or more video clips. Video clips added to the video clip sequence can be automatically modified (e.g. scaled and/or cropped) to conform to the dimensions and/or aspect ratio of video clips in the video clip sequence. Video clips can be modified based on the spatial characteristics of the video clips, including the location and size of objects of interest (e.g., faces) in the video clips. Video clips can be modified so that objects of interest may be preserved in the video clips (e.g., objects of interest are not wholly or partially cropped out, objects of interest are not reduced in size so that details are no longer visible). Implementations may also include a method, system and/or non-transitory, computer-readable medium encoded with instructions for performing smart scaling and cropping. Other aspects and implementations are also disclosed.

Particular implementations provide at least the following advantages. Video clips may be automatically modified to match display dimensions of other video clips in a video clip sequence. Objects of interest (e.g., faces) may be preserved while scaling and cropping video clips. Video effects, such as zooming in or zooming out, may be preserved.

Details of one or more implementations are set forth in the accompanying drawings and the description below. Other features, aspects, and potential advantages will be apparent from the description and drawings, and from the claims.

DESCRIPTION OF DRAWINGS

FIG. 3 illustrates example video clips having different display dimensions.

DETAILED DESCRIPTION

User Interfaces

Figure 1:
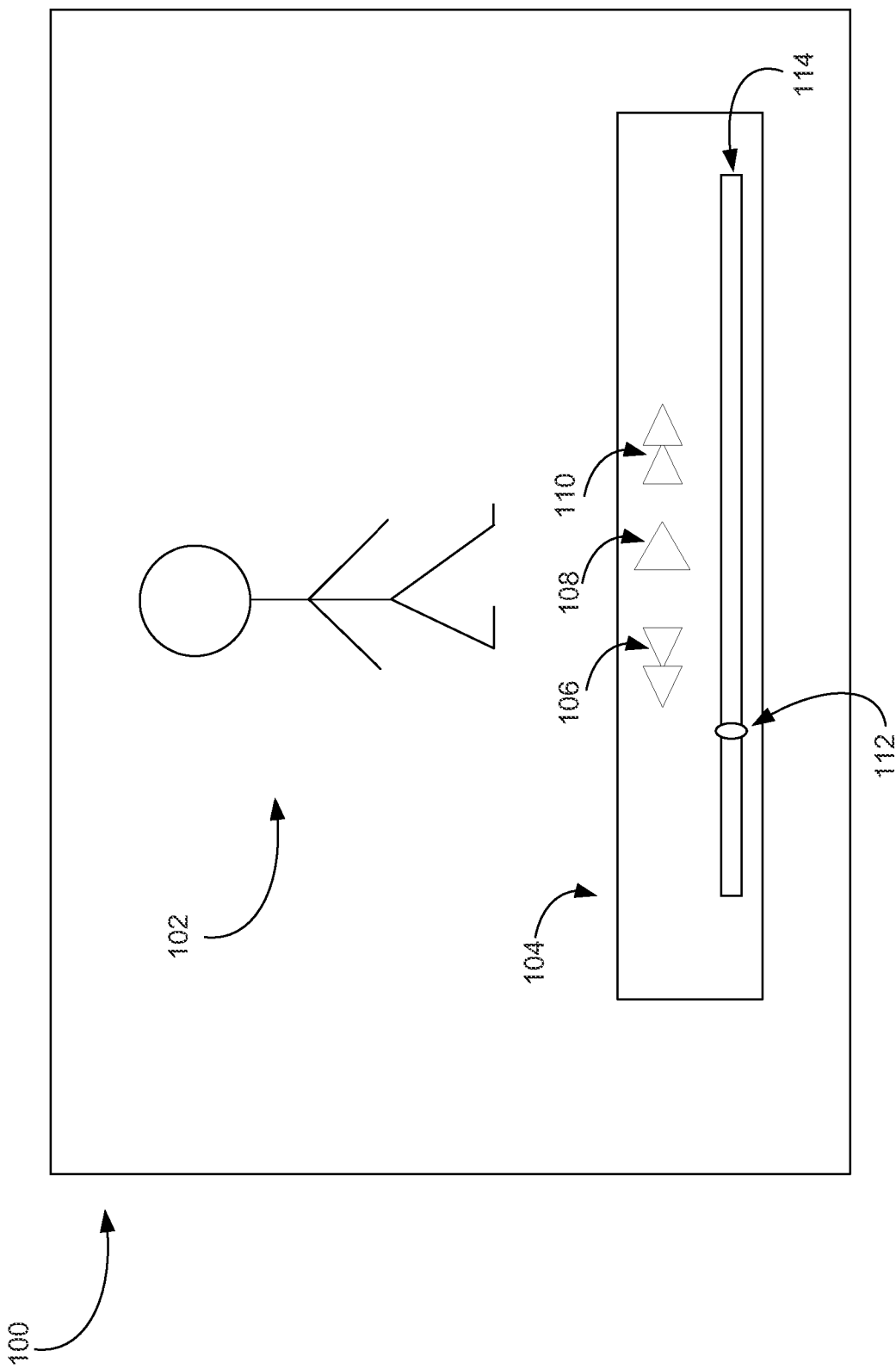
FIG. 1 illustrates an example playback interface.

FIG. 1 illustrates an exemplary playback interface for a video editing application. The video playback user interface includes display environment 100. For example, display environment 100 may be an application window displayed on a display of a computing device. The display environment may be configured to display an image 102. For example, image 102 may be a video image corresponding to one of a plurality of successive frames of a video (or video clip). Control element 104 includes user interface elements 106, 108 and 110 for controlling the display of video. For example, element 106 allows a user to rewind (move the video back in time) a video, element 108 allows a user to play a video, and element 110 allows a user to fast forward a video. Control element 104 may also include timeline 114 to indicate to a user the duration of a video, how much of the video has been played, or how much of the video remains to be played. Timeline 114 may include position indicator 112 to indicate to a user the current position in the timeline during playback of a video. The video playback interface may also provide a user interface element (not shown) for entering an edit mode of the video editing application. For example, a user may enter an edit mode of the video editing application by selecting a menu item from a pull-down menu or by selecting a user interface element displayed in display environment 100 or displayed on control element 104. A user may enter an edit mode of the video editing application by performing an editing action, such as pasting or dragging and dropping a video into display environment 100.

Figure 2:
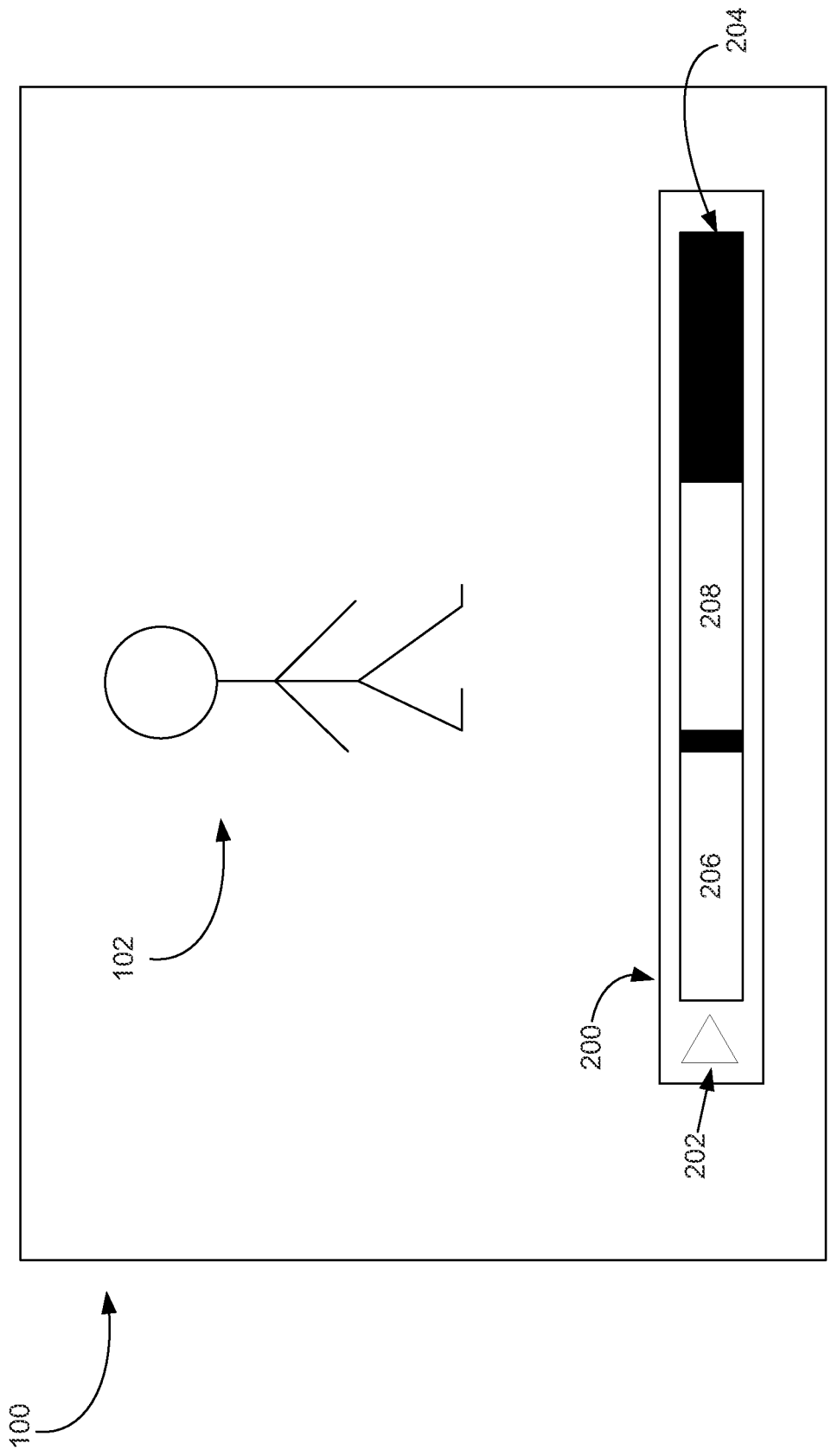
FIG. 2 illustrates an example editing interface.

FIG. 2 illustrates an exemplary editing interface for a video editing application that performs smart scaling and cropping. Display environment 100 may include control element 200. For example, control element 200 may be displayed when the video editing application is in an edit mode. Control element 200 may be a semi-transparent overlay control element that allows a user to see the displayed image 102 through the control element 200. Control element 200 may include user interface element 202 that allows a user to play a video and a timeline 204 that displays images representing portions of a video or video clip. For example, timeline 204 may display images representing video clip 206. Timeline 204 may include zero, one, or a plurality of video clips and may display images representing each video clip in timeline 204.

According to implementations, the video editing application may be configured so that video clip 206 may be added to timeline 204 by performing a drag and drop operation on video clip 206. For example, video clip 206 outside of display environment 100 (e.g., external to the video editing application) may be selected and dragged into display environment 100. If video clip 206 is dropped into display environment 100, video clip 206 may be added to timeline 204. If the video editing application is in playback mode, dropping video clip 206 into display environment 100 may cause the video editing application to enter video editing mode.

According to implementations, video clip sequences may be manipulated using timeline 204. For example, video clip 206 may be selected by a user, dragged to a location in timeline 204, and dropped at the location into a sequence of video clips displayed in timeline 204. If no video clips exist in timeline 204, video clip 206 is added to timeline 204. Video clips already in timeline 204 may be rearranged or removed through drag and drop operations. For example, a user may select video clip 206 in timeline 204 and drag it to a different location in timeline 204 to modify the sequence of video clips. To remove video clip 206 from timeline 204, the user may select video clip 206 and delete it via input to a keyboard (e.g., delete key or backspace key) or a user interface element (e.g., delete menu item on a pull-down menu). Rearranging video clips in timeline 204 may cause the video editing application to perform smart transitions, as described in detail below. Other video clips may be manipulated in the same way as video clip 206 described above.

In some implementations, timeline 204 may include video clip 206 and video clip 208. For example, video clip 208 may be added to timeline 204 by pasting video clip 208 into display environment 100. Video clip 208 may be added to timeline 204 by dragging and dropping video clip 208 into display environment 100 or by dragging and dropping video clip 208 directly into timeline 204. If video clip 208 is dropped into display environment 100, video clip 208 may be added to the end of timeline 204. For example, video clip 208 may be appended to other videos already in timeline 204, if any. If video clip 208 is dropped into timeline 204, video clip 208 may be added to timeline 204 at the position where video clip 208 was dropped into timeline 204. For example, video clip 208 may be inserted at the beginning, middle or end of timeline 204 based on where video clip 208 was dropped into timeline 204.

Video Clip Editing

FIG. 3 illustrates example video clips having different display dimensions. For example, video clip 206 and video clip 208 of FIG. 2 may have different display dimensions and/or aspect ratios. Video clip 206 may include video frames 300, 302 and 304. When played back and displayed on a video display device, video frames 300, 302 and 304 may produce video images that have specific dimensions and aspect ratios. For example, video frames 300, 302 and 304 may produce video images that have specific vertical (e.g., height) and horizontal (e.g., width) dimensions (e.g., in inches, pixels, etc.). Video frames 300, 302 and 304 may have a specific aspect ratio. For example, the aspect ratio of an image is the ratio of the width of the image to its height (e.g., 3:2, 4:3, 16:9, etc.). Each of the video frames 300, 302 and 304 in video clip 206 may have the same dimensions and aspect ratio.

Video clip 208 may include video frames 306, 308 and 310. Each of the video frames 306, 308 and 310 may have the same dimensions and aspect ratio. However, video frames 306, 308 and 310 may have dimensions and/or aspect ratios that are different than the dimensions and aspect ratio of the video frames 300, 302 and 304 of video clip 206. For example, video frame 304 from video clip 206 may have a 16:9 aspect ratio and corresponding dimensions, while video frame 306 may have a 4:3 aspect ratio and corresponding dimensions. Accordingly, when video clip 206 is played in sequence with video clip 208, the user will notice the change in dimensions and aspect ratio when video clip 206 ends and video clip 208 begins. The change in dimensions and aspect ratio may be visually jarring to a viewer of the video clip sequence and may make the video clip sequence difficult to watch.

In some implementations, video clip 208 may be modified so that the dimensions and aspect ratio of video clip 208 match the dimensions and aspect ratio of video clip 206. For example, when video clip 208 is added to timeline 204, video clip 208 may be automatically modified by scaling, cropping, or a combination of scaling and cropping video clip 208 so that the display dimensions and aspect ratio of video clip 208 matches the display dimensions and aspect ratio video clip 206.

Scaling

In some implementations, video clip 208 may be scaled so that the display dimensions and/or aspect ratio of video clip 208 match the dimensions and aspect ratio of video clip 206. For example, video clip 208 may be horizontally and/or vertically scaled to match the dimensions of video clip 206. However, if video clip 208 is scaled only in one dimension, or unequally in both dimensions, the image produced from video clip 208 may become distorted. For example, if video clip 208 is scaled only horizontally, the image produced from video clip 208 may appear to be horizontally stretched. Likewise, if video clip 208 is scaled only vertically, the image produced from video clip 208 may appear to be vertically stretched. An image that appears to be stretched may not be visually pleasing to a viewer. Accordingly, if scaling is required, a more visually pleasing video image may be produced by scaling video clip 208 in both dimensions (e.g., horizontally and vertically).

According to some implementations, video clip 208 may be scaled both horizontally and vertically. For example, video clip 208 may be scaled horizontally and vertically by the same factor (e.g., by the same multiplier, according to the same scale). If video clip 206 and video clip 208 have the same aspect ratios, scaling both dimensions by the same factor may allow video clip 208 to be modified to have the same dimensions as video clip 206. However, if video clip 208 is scaled down (e.g., reduced dimensions), objects of interest displayed in video clip 208 may be difficult to see. For example, if video clip 208 contains images of people or faces, reducing the scale of the video image may make the people or faces difficult to see. A combination of scaling and cropping may be used to modify video clip 208 to match the dimensions of video clip 206 so that objects of interest remain at a size that is visually pleasing to a viewer, as disclosed in detail below.

If video clip 208 has a different aspect ratio than video clip 206, scaling both dimensions equally may not allow the dimensions of video clip 208 to match the dimensions of video clip 206. A combination of scaling and cropping may be used to modify video clip 208 to match the dimensions of video clip 206, as disclosed in detail below.

Cropping

According to some implementations, video clip 208 may be cropped so that the dimensions of video clip 208 match the dimensions of video clip 206. For example, if the dimensions of video clip 208 are bigger than the dimensions of video clip 206, video clip 208 may be cropped to match the dimensions of video clip 206. If video clip 208 has display dimensions of 20-by-30 inches and video clip 206 has display dimensions of 10-by-20 inches, video clip 208 may be cropped to produce a 10-by-20 inch display image, for example. However, if video clip 208 has smaller dimensions than video clip 206, a combination of scaling and cropping may be used to modify video clip 208 to match the dimensions of video clip 206, as disclosed further below.

Smart Scaling and Cropping

According to some implementations, smart scaling and cropping may be performed. For example, a combination of scaling and cropping may be performed to modify video clip 208 to match the dimensions of video clip 206 while preserving objects of interest (e.g., people, faces, buildings, cars, etc.). Smart scaling and cropping may be performed to preserve effects in the video clip 206, such as zooming in or zooming out. According to some implementations, smart scaling and cropping may be performed on a specified or preconfigured number of frames at the beginning of video clip 208.

Smart Scaling

In some implementations, smart scaling may be performed. According to some implementations, video clip 208 may be scaled equally in both dimensions so that at least one dimension of video clip 208 matches at least one dimension of video clip 206. For example, video clip 208 may be scaled such that the horizontal dimension of video clip 208 matches the horizontal dimension of video clip 206. Video clip 208 may be scaled such that the vertical dimension of video clip 208 matches the vertical dimension of video clip 206. In some implementations, video clip 208 may be scaled such that a dimension of video clip 208 matches the longest corresponding dimension of video clip 206. For example, if the longest dimension of video clip 206 is the horizontal dimension, video clip 208 may be scaled such that the horizontal dimension of video clip 208 matches the length of the horizontal dimension of video clip 206.

In some implementations, video clip 208 may be scaled equally in both dimensions such that objects of interest in video clip 208 appear to be about the same size as objects of interest in video clip 206. For example, if video clip 208 and video clip 206 contain faces, video clip 208 may be scaled so that the faces in video clip 208 appear to be about the same size as the faces in video clip 206. In some implementations, video clip 206 may be analyzed to determine the size of the objects of interest video clip 206. For example, a specified (or preconfigured) number of frames at the end of video clip 206 may be analyzed to determine the diameter (e.g., number of pixels) of the faces in video clip 206. In some implementations, video clip 208 may be scaled so that the faces in the beginning frames (e.g., some specified or preconfigured number of frames) of video clip 208 have about the same diameter. For example, scaling video clip 208 based on the sizes of objects of interest (e.g., faces) in video clip 206 may prevent video clip 208 from being scaled down too much and may prevent objects of interest in video clip 208 from becoming too small to view details of the objects as a result of scaling.

In some implementations, the scaling of video clip 208 may be adjusted to preserve effects captured in video clip 208. For example, if video clip 208 has been zoomed in or zoomed out, the scaling of video clip 208 may be adjusted to preserve the zoom effect. In some implementations, a beginning portion (e.g., beginning number of frames) of video clip 208 may be compared to an ending portion (e.g., ending number of frames) of video clip 208 to determine whether video clip 208 includes a zoom effect. For example, if objects of interest at the beginning of video clip 208 are smaller than the same objects of interest at the ending of video clip 208, the device that captured video clip 208 may have been zoomed-in to make the objects bigger. If objects of interest at the beginning of video clip 208 are bigger than the same objects of interest at the ending of video clip 208, the device that captured video clip 208 may have been zoomed-out to make the objects of interest smaller. In some implementations, the scale of video clip 208 may be adjusted to preserve the zoom effect. For example, if video clip 208 includes a zoom-in effect, the scale of video clip 208 may be adjusted so that the objects of interest at the beginning of video clip 208 remain a smaller size than the objects of interest at the end of video clip 208. If video clip 208 includes a zoom-out effect, the scale of video clip 208 may be adjusted so that the objects of interest at the beginning of video clip 208 remain a bigger size than the objects at the end of video clip 208.

Smart Cropping

According to some implementations, once video clip 208 has been scaled, smart cropping may be performed. In some implementations, smart cropping may be performed before scaling video clip 208. In some implementations, only smart cropping may be performed. For example, if video clip 208 has bigger dimensions than video clip 206, only smart cropping may be performed.

Figure 4A:
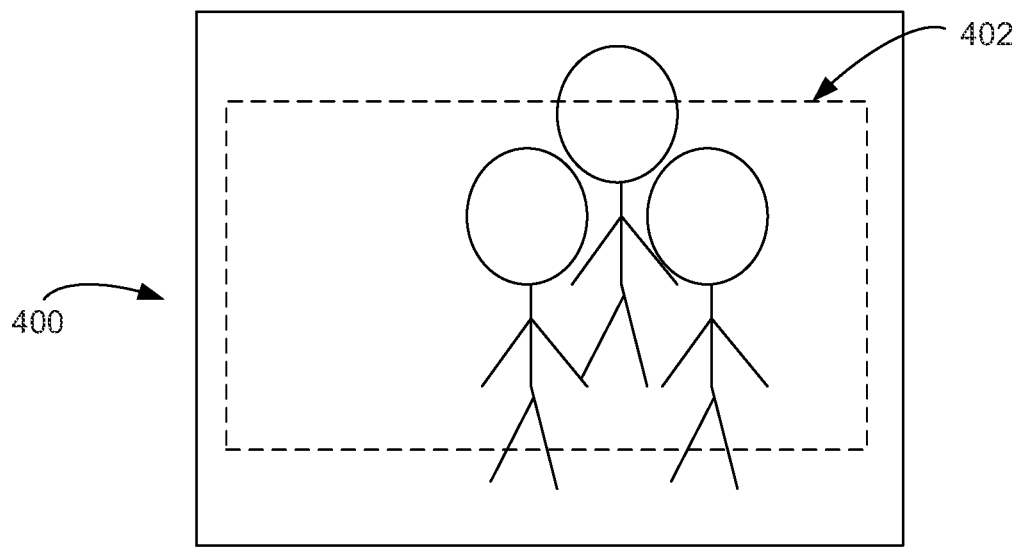
FIG. 4A illustrates an example of center-cropping.

In some implementations, video clip 208 may be center-cropped. FIG. 4A illustrates an example of center-cropping. For example, frame 400 may be a frame of video clip 208. Bounding box 402 may have dimensions that match video clip 206. In some implementations, bounding box 402 may be used to identify which portions of frame 400 to preserve and which portions of frame 400 to crop. For example, the portion of frame 400 within bounding box 402 may be preserved and the portions of frame 400 outside bounding box 402 may be cropped (e.g., deleted, removed, not displayed). In some implementations, center-cropping may be performed by centering the bounding box 402 in frame 400 and removing portions of frame 400 outside of bounding box 402. For example, the center of bounding box 402 and the center of frame 400 may be aligned and cropping subsequently performed.

However, as illustrated by FIG. 4A, center-cropping may have undesired effects on the displayed image. For example, if frame 400 includes images of three people, center cropping may result in a portion of one or more of the people being cut off. Of particular concern, one or more of the people in frame 400 may be at risk of being partially or wholly decapitated, for example. That is, only a portion of a person's face or head may survive the center-cropping process. A viewer of center-cropped video clip 208 (video frame 400) may not find the partial image of a person, or person's head or face, visually pleasing.

According to some implementations, smart cropping may be performed to modify video clip 208 to match the dimensions of video clip 206 while preserving objects of interest in video clip 208. For example, if video clip 208 includes images of people's faces, smart cropping may be performed to preserve the faces. In some implementations, face detection may be performed to identify locations of faces in frames of video clip 208. For example, face detection may be performed on one or more video frames at the beginning of video clip 208 to identify locations in the video frames where faces appear. In some implementations, video clip 208 may be cropped based on the locations of the faces in the video frames.

Figure 4B:
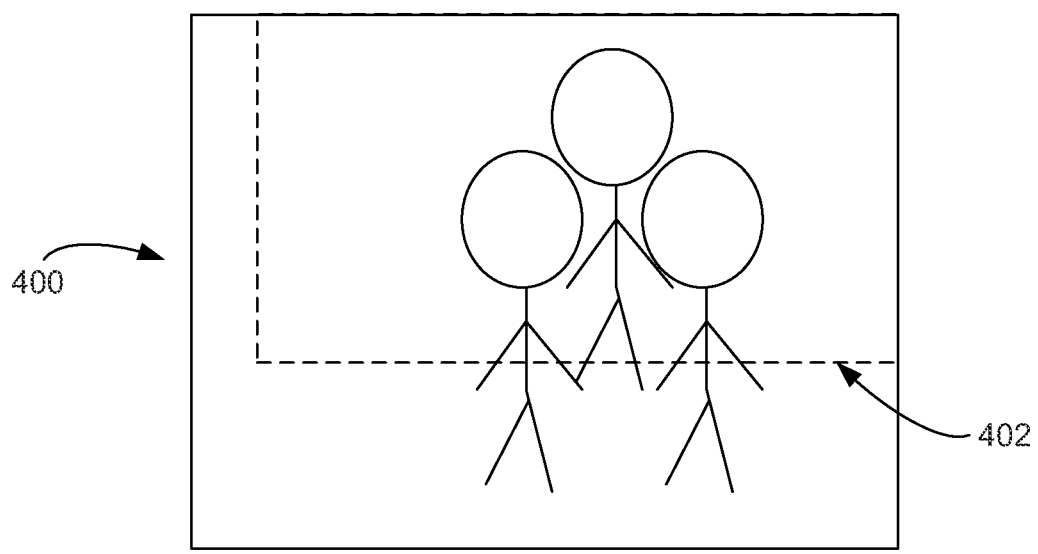
FIG. 4B illustrates an example of smart cropping.

FIG. 4B illustrates an example of smart cropping. For example, the identified locations of the faces in video frame 400 may be used to determine the placement of bounding box 402. In some implementations, the identified locations of the faces may be combined or averaged to determine where the center of the bounding box should be placed. If the faces are located at the edge of a frame image, a bounding box centered on the faces may extend beyond the edge of the frame. In this case, the center of the bounding box may be adjusted so that the edge of the bounding box is at the edge of the frame and the faces are entirely within the bounding box, as illustrated by FIG. 4B.

According to some implementations, edge detection may be performed to determine the placement of bounding box 402. For example, edge detection may be performed to determine the edges of the faces. In some implementations, the location of bounding box 402 within frame 400 may be adjusted so that the edges of bounding box 402 do not intersect the edge of any face detected by edge detection. Once the location of bounding box 402 has been adjusted based on edge detection, video frame 400 may be cropped based on bounding box 402.

In some implementations, scaling may be performed so that the faces detected in video frame 400 fit within bounding box 402. For example, if bounding box 402 intersects a face in video frame 400, the scale of video frame 400 may be adjusted so that bounding box 402 no longer intersects the face. Video frame 400 may be scaled up (e.g., increased in size) or scaled down (e.g., decreased in size) so that the intersected face is either wholly outside or wholly inside of bounding box 402, for example.

In some implementations, smart cropping may be performed to preserve a border around objects of interest. For example, a border of a preconfigured or specified width (e.g., number of pixels, inches, centimeters) may be preserved around faces in a video frame when cropping. In some implementations, bounding box 402 may be fit to faces detected in a video frame based on the border width. For example, faces, or the edge of faces, may be detected in frame 400, bounding box 402 may be placed in frame 400 so that the faces are within bounding box 402, the placement of bounding box 402 may be adjusted within frame 400 so that a border between the faces and bounding box 402. For example, bounding box 402 may be offset from the faces by the width of the border so that some space exists between the edge of the bounding box and the edge of the faces.

Example Process

Figure 5:
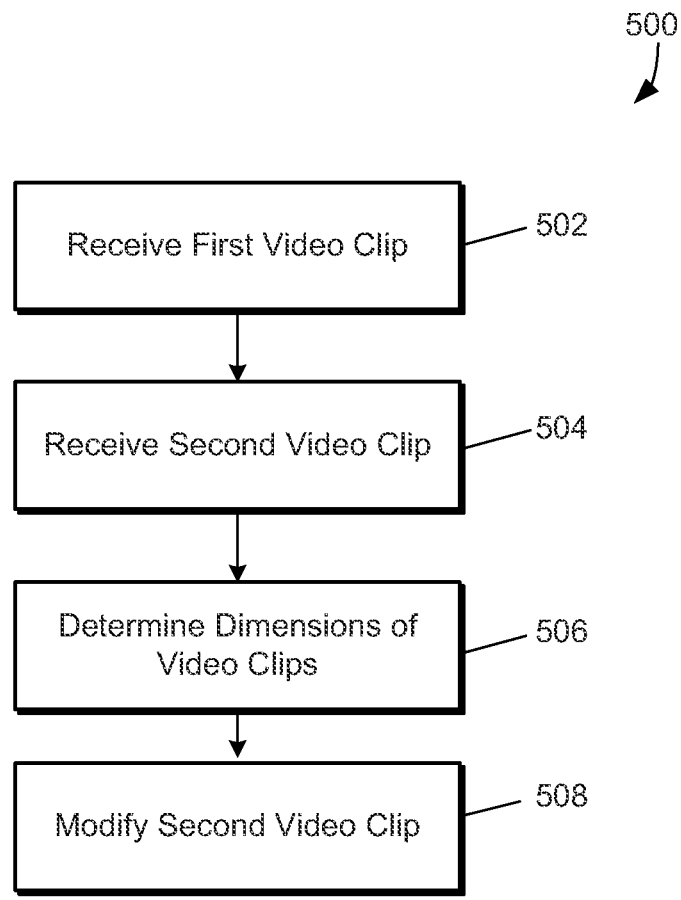
FIG. 5 is a flow diagram of an example smart scaling and cropping process.

FIG. 5 is flow diagram of an example smart scaling and cropping process 500. At step 502, a first video clip is received. For example, a video clip (e.g., video clip 206 of FIG. 2) may be received in a user interface of a video editing application executing on a computing device. The first video clip may have a spatial composition that includes one or more objects of interest. For example, the spatial composition may include the size and/or location of objects within frames of the first video clip. The one or more objects of interest may be people, faces, buildings, animals, or other objects that people usually take pictures of, for example.

At step 504, a second video clip is received. For example, a video clip (e.g., video clip 208 of FIG. 2) may be received in the user interface of the video editing application. The second video clip may have a spatial composition that includes one or more objects of interest. The objects of interest in the second video clip may be the same objects as the objects of interest in the first video clip. The objects of interest in the second video clip may be different objects than the objects of interest in the first video clip.

At step 506, the dimensions of the video clips may be determined. For example, upon receiving the second video clip, the dimensions of the first video clip and the second video clip may be compared to determine whether the second video clip has the same dimensions as the first video clip. If the second video clip has the same dimensions as the first video clip, no scaling and/or cropping may be required. If the second video clip has different dimensions than the first video clip, the second video clip may be scaled and/or cropped to make the second video clip conform to the dimensions of the first video clip.

At step 508, the second video clip is modified. For example, the second video clip may be modified (e.g., scaled and/or cropped) to make the dimensions of the second video clip match the dimensions of the first video clip. According to implementations, the second video clip may be scaled and/or cropped based on the spatial composition (e.g., location and size of objects) of frames of the second video clip. For example, the second video clip may be scaled based on a comparison between the size of objects of interest in the first video clip and the size of objects of interest in the second video clip. The second video clip may be cropped based on the location of objects of interest in the second video clip. For example, the location of faces may be determined based on known face detection and/or known edge detection algorithms and the second video clip may be cropped based on the location of the faces. As discussed above, other criteria may be used to determine how to scale and/or crop the second video clip so that it conforms to the dimensions of the first video clip while preserving objects of interest in the second video clip.

Example System Architecture

Figure 6:
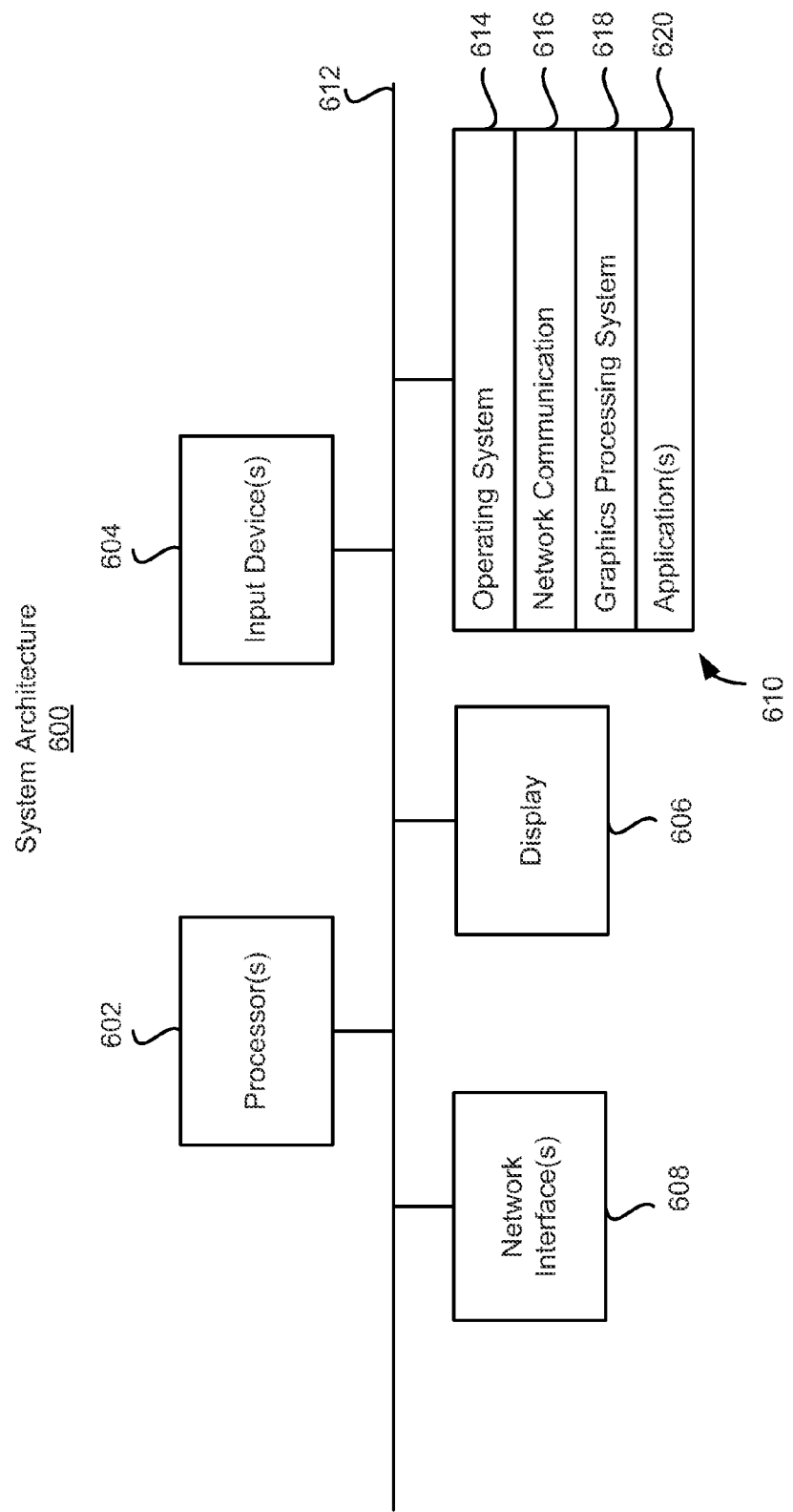
FIG. 6 is a block diagram of an exemplary system architecture implementing the features and processes of FIGS. 1-5.

FIG. 6 is a block diagram of an example system architecture implementing the features and processes of FIGS. 1-5. The architecture 600 can be implemented on any electronic device that runs software applications derived from compiled instructions, including without limitation personal computers, servers, smart phones, media players, electronic tablets, game consoles, email devices, etc. In some implementations, the architecture 600 can include one or more processors 602, one or more input devices 604, one or more display devices 606, one or more network interfaces 608 and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but are not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire. Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.).

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

A graphics processing system 618 can include instructions that provide graphics and image processing capabilities. For example, the graphics processing system 618 can implement the resampling processes, as described with reference to FIGS. 1-5.

Application(s) 620 can be an image processing application or any other application that uses the resampling processes described in reference to FIGS. 1-5, such as a photo or video editor. The resampling processes can also be implemented in operating system 614.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   receiving a first video clip in a graphical user interface of a video editing device, the first video clip having a first dimension, wherein the first dimension is a dimension of a first object within a frame of the first video clip;
   receiving a second video clip in the graphical user interface, the second video clip having a second dimension, wherein the second dimension is a dimension of a second object within a frame of the second video clip;
   upon receiving the second video clip automatically, within the video editing device, determining whether the second dimension is different than the first dimension, wherein the determining includes performing a comparison operation on the first dimension and the second dimension;
   determining, automatically using one or more processors within the video editing device, a first spatial composition including a first object associated with the first video clip and a second spatial composition including a second object associated with the second video clip; and
   modifying, automatically using the one or more processors within the video editing device, the second video clip based on the first dimension when the second dimension is different than the first dimension, the modifying including scaling the second video clip based on an automatic comparison of the first spatial composition and the second spatial composition; and
   combining, automatically on the video editing device in response to modifying the second video clip, the first video clip and the second video clip into a video clip sequence.

2. The method of claim 1, further comprising:
   scaling the second video clip so that the second dimension is equal to the first dimension.

3. The method of claim 1, further comprising:
   cropping the second video clip so that the second dimension is equal to the first dimension.

4. The method of claim 1, further comprising:
   detecting one or more objects in the second video clip, wherein the one or more objects include the second object within a frame of the second video clip.

5. The method of claim 4, wherein the one or more objects are faces.

6. The method of claim 4, further comprising:
   cropping the second video clip based on a location of the one or more objects in the second video clip.

7. The method of claim 4, wherein scaling the second video clip includes automatically determining a size of the one or more objects in the second video clip, and scaling based on the size of the one or more objects.

8. A method comprising:
receiving, at a video editing device, a first video clip including a first object, the first video clip having a first spatial composition including the first object;
receiving, at the video editing device, a second video clip including a second object, the second video clip having a second spatial composition including the second object, where the second spatial composition is different than the first spatial composition;
comparing, automatically on the video editing device and in response to receiving the second video clip, the first spatial composition and the second spatial composition;
the video editing device automatically modifying the second video clip based at least in part on the comparing the first spatial composition and the second spatial composition, wherein the modifying includes scaling or cropping the second video clip; and
combining, automatically on the video editing device in response to modifying the second video clip, the first video clip and the second video clip into a video clip sequence; wherein spatial composition includes location and size of objects within frames of a video clip.

9. The method of claim 8, wherein the first and second objects are faces.

10. The method of claim 8, further comprising:
comparing a first size of the first object and a second size of the second object;
modifying the second video clip based on the comparison between the first size and the second size.

11. The method of claim 8, further comprising:
scaling the second video clip based on a comparison between a first size of the first video clip and a second size of the second video clip.

12. The method of claim 8, wherein the first video clip has one or more first dimensions and the second video clip has one or more second dimensions; and
further comprising cropping the second video clip so that the one or more second dimensions match the one or more first dimensions.

13. The method of claim 12, further comprising:
scaling the second video clip so that at least one of the one or more second dimensions match at least one of the one or more first dimensions of the first video clip.

14. The method of claim 8, further comprising:
modifying the second video clip based on a comparison between the first and second spatial composition.

15. The method of claim 8, further comprising:
determining the second spatial composition, including a size of the second object.

16. The method of claim 8, further comprising:
determining the second spatial composition, including a location of the second object.

17. The method of claim 8, further comprising:
cropping the second video clip based on a location of the second object.

18. A non-transitory computer-readable medium including one or more sequences of instructions which, when executed by one or more processors, causes:
receiving a first video clip in a graphical user interface of a video editing device, the first video clip having a first dimension, wherein the first dimension is a dimension of an object within a frame of the first video clip;
receiving a second video clip in the graphical user interface, the second video clip having a second dimension, wherein the second dimension is a dimension of an object within a frame of the second video clip;
upon receiving the second video clip automatically, within the video editing device, determining whether the second dimension is different than the first dimension, wherein the determining includes performing a comparison operation on the first dimension and the second dimension;
determining, automatically within the video editing device, a first spatial composition including a first object associated with the first video clip and a second spatial composition including a second object associated with the second video clip; and
modifying, automatically within the video editing device, the second video clip based on the first dimension when the second dimension is different than the first dimension, the modifying including scaling the second video clip based on an automatic comparison of the first spatial composition and the second spatial composition; and
combining, automatically on the video editing device in response to modifying the second video clip, the first video clip and the second video clip into a video clip sequence.

19. The non-transitory computer-readable medium of claim 18, wherein the instructions comprise instructions that cause detecting one or more objects in the second video clip.

20. The non-transitory computer-readable medium of claim 19, wherein the one or more objects are faces.

21. The non-transitory computer-readable medium of claim 19, wherein the instructions comprise instructions that cause cropping the second video clip based on a location of the one or more objects in the second video clip.

22. The non-transitory computer-readable medium of claim 19, wherein the instructions comprise instructions that cause scaling the second video clip based on a size of the one or more objects in the second video clip.

* * * * *